(12) United States Patent
Gore et al.

(10) Patent No.: US 10,173,196 B2
(45) Date of Patent: Jan. 8, 2019

(54) FILTERING MEDIUM FOR FLUID PURIFICATION

(75) Inventors: Avinash Gore, Johnstown, PA (US); Bo Hu, Greensburg, PA (US); Sydney Luk, Cherry Hill, NJ (US)

(73) Assignee: HÖGANÄS AB (PUBL), Höganäs (SE)

( * ) Notice: Subject to any disclaimer, the term of this patent is extended or adjusted under 35 U.S.C. 154(b) by 503 days.

(21) Appl. No.: 13/984,318

(22) PCT Filed: Feb. 7, 2012

(86) PCT No.: PCT/EP2012/052001
§ 371 (c)(1),
(2), (4) Date: Oct. 17, 2013

(87) PCT Pub. No.: WO2012/107422
PCT Pub. Date: Aug. 16, 2012

(65) Prior Publication Data
US 2014/0034576 A1    Feb. 6, 2014

Related U.S. Application Data

(60) Provisional application No. 61/441,064, filed on Feb. 9, 2011.

(30) Foreign Application Priority Data

Feb. 9, 2011  (SE) ..................... 1150100

(51) Int. Cl.
*B01J 20/02*    (2006.01)
*B01D 15/20*    (2006.01)
(Continued)

(52) U.S. Cl.
CPC .......... *B01J 20/0229* (2013.01); *B01D 15/00* (2013.01); *B01D 15/20* (2013.01);
(Continued)

(58) Field of Classification Search
None
See application file for complete search history.

(56) References Cited

U.S. PATENT DOCUMENTS 4,642,192 A   2/1987  Heskett
5,378,426 A * 1/1995  Geibel .............. B01D 39/2034
                                          419/11
(Continued)

FOREIGN PATENT DOCUMENTS

DE    37 29 030 A1      3/1989
DE       3729030 A1 *   3/1989  .............. B01J 20/02
(Continued)

OTHER PUBLICATIONS

Machine translation of Hasenpusch et al. (DE # 3729030), pp. 1-5.*
(Continued)

*Primary Examiner* — Clare M Perrin
(74) *Attorney, Agent, or Firm* — Buchanan, Ingersoll & Rooney P.C.

(57) ABSTRACT

The present invention concerns a filtering medium, a method for the production thereof, the use of said filtering medium and a method for reducing the content of multiple contaminants simultaneously in fluids by means of said filtering medium, wherein said filtering medium consists of or comprises at least one of the following: a mixture (A) containing a major part of an iron-based powder and a minor part of a silver powder, an iron-silver powder alloy (B), and an iron-based porous and permeable composite containing silver (C).

10 Claims, 3 Drawing Sheets

(51) Int. Cl.
 *B01D 15/00* (2006.01)
 *B01J 20/30* (2006.01)
 *B01D 39/20* (2006.01)
 *C02F 1/50* (2006.01)
 *C02F 1/28* (2006.01)
 *B01J 20/28* (2006.01)
 *C02F 101/12* (2006.01)
 *C02F 1/70* (2006.01)
 *C02F 101/20* (2006.01)
 *C02F 101/30* (2006.01)
 *C02F 101/16* (2006.01)

(52) U.S. Cl.
 CPC ......... *B01D 39/2034* (2013.01); *B01J 20/02* (2013.01); *B01J 20/0233* (2013.01); *B01J 20/28004* (2013.01); *B01J 20/3078* (2013.01); *C02F 1/288* (2013.01); *C02F 1/505* (2013.01); *B01D 2239/0407* (2013.01); *B01J 20/0203* (2013.01); *B01J 20/2803* (2013.01); *B01J 20/28057* (2013.01); *B01J 2220/42* (2013.01); *C02F 1/281* (2013.01); *C02F 1/705* (2013.01); *C02F 2101/12* (2013.01); *C02F 2101/163* (2013.01); *C02F 2101/166* (2013.01); *C02F 2101/20* (2013.01); *C02F 2101/30* (2013.01); *C02F 2303/04* (2013.01)

(56) References Cited

U.S. PATENT DOCUMENTS

| | | | |
|---|---|---|---|
| 5,534,154 | A | 7/1996 | Gillham |
| 6,261,986 | B1 | 7/2001 | Bowman et al. |
| 6,303,039 | B1 | 10/2001 | Back et al. |
| 6,723,230 | B1 * | 4/2004 | Chen ............... B01J 20/3458 208/211 |
| 6,827,757 | B2 | 12/2004 | Ozaki et al. |
| 6,942,807 | B1 | 9/2005 | Meng et al. |
| 7,569,199 | B1 * | 8/2009 | Barron ............... B01D 53/02 208/208 R |
| 2005/0118051 | A1 * | 6/2005 | Harada ............ B01D 39/2034 419/2 |
| 2006/0021946 | A1 | 2/2006 | Hensman et al. |
| 2007/0241063 | A1 | 10/2007 | St-Laurent et al. |
| 2009/0163359 | A1 * | 6/2009 | Kanazawa ........ B01D 53/9481 502/400 |
| 2009/0218266 | A1 | 9/2009 | Sawafta et al. |
| 2010/0050872 | A1 * | 3/2010 | Lee .................. B01D 39/2031 95/279 |
| 2010/0176044 | A1 | 7/2010 | Domb et al. |

FOREIGN PATENT DOCUMENTS

| | | | | |
|---|---|---|---|---|
| EP | 1 273 371 A2 | 1/2003 | | |
| JP | WO 2006095801 A1 * | 9/2006 | ............ | A61L 9/01 |
| KR | 2003-0068528 A | 8/2003 | | |
| KR | 20030068528 A | 8/2003 | | |
| WO | WO 03/076341 A2 | 9/2003 | | |
| WO | WO 2008/129551 A1 | 10/2008 | | |
| WO | WO 2010/019934 A1 | 2/2010 | | |

OTHER PUBLICATIONS

Machine translation of Masumori et al. (JP # 2006281191, equivalent to WO # 2006/095801), pp. 1-6.*
Hasenpusch et al. (German Patent # 3729030); machine translation, pp. 1-2.*
Xu et al. ("Subcolloidal Fe/Ag Particles for Reductive Dehalogenation of Chlorinated Benzenes", Ind. Eng. Chem. Res., 2000, 39, 2238-2244).*
Yue Xu et al., "Subcolloidal Fe/Ag Particles for Reductive Dehalogenation of Chlorinated Benzenes", Ind. Eng. Chem. Res. (2000) vol. 39 (pp. 2238-244) American Chemical Society.
International Search Report (PCT/ISA/210) dated May 24, 2012, by the European Patent Office as the International Searching Authority for International Application No. PCT/EP2012/052001.
Written Opinion (PCT/ISA/237) dated May 24, 2012, by the European Patent Office as the International Searching Authority for International Application No. PCT/EP2012/052001.

* cited by examiner

ND OF THE INVENTION

The present invention relates to a filtering medium, a method for the production thereof, use of said filtering medium and a method for reducing the content of multiple contaminants simultaneously in fluids by means of said filtering medium.

BACKGROUND OF THE INVENTION

Toxic inorganic/organic substances in various water sources have to be reduced below regulated levels before the water goes into drinking water systems or is released into recipients.

Nitrate ($NO_3^-$) is a common inorganic contaminant found in groundwater in the areas where agriculture activities occur heavily. Nitrates usually come from fertilizers, used in farming and gardening in order to provide the plants and shrubs with nutrients.

Other contaminants which may be generated from such activities are phosphates ($PO_4^{3-}$) and traces of pesticides such as atrazine. Accumulation of fertilizers is a problem as they can go through the soil and contaminate ground water systems. Both shallow water wells and deep water wells can be affected.

Toxic metals such as arsenic (As), chromium (Cr), whereof its oxidation state +6 ($Cr^{VI}$) is regarded as most harmful, lead (Pb), mercury (Hg), cadmium (Cd), selenium (Se), etc, other substances as chlorinated hydrocarbons and other organic substances, sometimes measured as Total Organic Carbon (TOC) are generated either from natural origins or from industrial or farming activities.

Other types of contaminants that may be present in the water are microorganisms, such as bacteria.

A conventional method for killing bacteria is the use of the chlorination process where chlorine containing chemical substances is added to the water for disinfection. Chlorine is a highly efficient disinfectant, however one of the drawbacks with this process is the remaining chlorine compounds in the water, such as $ClO^-$ ions which can cause health problems.

In order to reach acceptable levels of contaminants in drinking water, several processes are currently used.

Reverse osmosis is based on the process of osmosis. This involves the selective movement of water from one side of a membrane to the other. This technique is also very energy consuming.

The ion exchange process percolates water through bead-like spherical resin materials (ion-exchange resins). Ions in the water are exchanged for other ions fixed to the beads. Microorganisms can attach to the resins, providing a culture medium for rapid bacterial growth and subsequent pyrogen generation. This technique has a low initial capital investment but a high long-term operational cost.

One of the above techniques is usually applied to target one, or in some cases two contaminants present in the water. This means that several techniques often need to be applied following each other, in a chain process. In order to increase the efficiency, reducing costs, it would be desirable to purify the water from several contaminants in one single step. However, today there are few products available in the market capable of effectively purifying water from multiple contaminants simultaneously.

US patent publication no. 2007/0241063A1 describes a process for treating water contaminated with a volatile organic compound with iron powder granules containing iron, carbon and oxygen.

U.S. Pat. No. 5,534,154 describes a procedure for treating contaminated water by passing the water containing contaminant in solution through a permeable body of treatment material comprising particles of an adsorptive material physically mixed with particles of metal. The iron metal particles mentioned in the patent are iron fillings generally in solid granular form. The procedure requires a negative Eh voltage which in turn demands oxygen exclusion.

U.S. Pat. No. 6,827,757 describes a magnetite-iron based composite with very small average particle size of 0.05-10 µm.

EP 1273371A2 describes an iron powder adapted to remediate selected media by dehalogenating halogenated hydrocarbons in the media comprising iron powder particles and inorganic compounds. Said inorganic compounds should have a very low electric resistivity, and are preferably selected from the group consisting of Ca, Ti, V and Cr. Said inorganic compounds should be present on at least a portion of the surface of each particle.

WO 2008/129551 discloses a liquid filter medium comprising carbonaceous material, a water-insoluble metal oxide or hydroxide, and at least one of chitosan and an ion exchanger.

U.S. Pat. No. 4,642,192 discloses a method of reducing the concentration of inorganic chlorine by passing water through a bed of metal particles, brass. This method shows insignificant effect on reduction of nitrate.

U.S. Pat. No. 6,303,039 discloses a formulation comprising at least two biocide metals and at least one chelating agent, wherein said formulation dissolves over a period of months or longer.

WO 03/076341 describes a system for control of bacterial growth in water comprising antimicrobial treatment media within a containment vessel, the treatment media including one or more of transition metals and transition metal oxides.

U.S. Pat. No. 6,261,986 provides a method for producing a pollutant adsorption and degradation article and the article itself. At least one adsorbent is mixed with at least one pollutant transforming agent to form a mixture. This mixture is compacted to form a porous highly permeable article. Zeolites or surface modified zeolites, SMZ, are proposed as adsorbent and iron powder or iron in combination with other metals such as silver are proposed as pollutant transforming agent. Reduction of chromate and perchloroethylene in water was using the article was demonstrated.

U.S. Pat. No. 6,942,807 provides a water filter device and method which removes heavy metals and organic compounds from raw water. The device comprises at least one iron filter connected in series to a sand filter.

In US 2006/0021946 the use of volcanic rock or recycled minerals from anthropogenic brick to remove toxic metals from contaminated aqueous solutions is disclosed. The volcanic rock or recycled minerals from anthropogenic brick may be combined with zero valent iron, oxidized iron derivates and activated carbon.

The published patent application US 2009/0218266 discloses an ion delivery system, IDS, that comprises a source of metal ions with biocidal properties and a matrix that immobilizes the source of ions and provides a sustained release of ions at biocidal concentrations. Such source may be metal salts, metal particles or particulate metallic alloy. Silver combined with various metals are disclosed. The particle size of the metals or alloys being from 5 to 2 000 nm, preferably under 1 000 nm and most preferably between 100-300 nm.

US 2010/0176044 provides a carbonaceous filtering media for treating drinking water. In some embodiments the filtering media contains silver as an antimicrobial component.

The published application WO2010/019934 provides a process for removing virus from drinking water comprising filtering drinking water through a layer of coarse sand and contacting the drinking water with a composite iron matrix. The composite iron matrix comprises components containing iron, manganese, cerium, carbon phosphorous, sulfur, aluminum silicon, chromium, copper and zinc.

SUMMARY OF THE INVENTION

It is previously known that silver containing powder can kill bacteria when the content of silver is greater than certain percentage but have very little effect on the reduction of nitrate. It is also previously known that iron containing powders can only reduce insignificant amounts of nitrate.

The inventors of the present invention have now surprisingly found that using a combination of silver and iron in powder form, a significant synergetic and/or catalyst effect can be obtained which is shown in a surprisingly enhanced capability of killing bacteria and reducing nitrate and chlorine. Thus such combination can reduce significant amounts of heavy metals, bacteria, chlorine and nitrate simultaneously. The synergetic effect can be achieved by optimizing the combination through choosing the type of iron powder and silver powder, determining the amount of silver, and the method of preparing the iron-based filtering medium containing silver.

The filtering medium according to the present invention may also be used for reducing other contaminants such as nitrites, heavy metals, such as As, Cr, especially Cr having the most stable state at oxidation stage +6, Pb, Hg, toxic organic and inorganic compounds, other microorganisms or combinations thereof.

The present invention relates to a filtering medium for reducing the content of contaminants in fluids, wherein said filtering medium comprises iron and silver in a form chosen from at least one of: —a mixture (A) comprising a major part of an atomized iron-based or iron powder and a minor part of a silver powder; —an iron-silver powder alloy (B); and —a silver containing iron-based porous and permeable composite (C); and wherein said contaminants are selected from the group consisting of chlorine containing compounds, nitrates, nitrites, heavy metals, toxic inorganic substances, toxic organic compounds, microorganisms and/or combinations thereof. The present invention also relates to a method for reducing the content of contaminants in fluids comprising the steps of:

a) providing a filtering medium comprising iron and silver in a form chosen from at least one of:
  a mixture (A) containing a major part of an iron-based powder and a minor part of a silver powder,
  an iron-silver alloy (B), and
  a silver containing iron-based porous and permeable composite (C),
b) bringing one or more contaminated fluid(s) in contact with the filtering medium to purify said one or more fluid(s),
c) optionally removing the filtering medium from the purified one or more fluid(s).

Further, the present invention relates to a method for the production of a filtering medium comprising iron and silver in a form chosen from at least one of:
  a mixture (A) containing a major part of an iron-based powder and a minor part of a silver powder,
  an iron-silver alloy (B), and
  a silver containing iron-based porous and permeable composite (C), wherein
  the mixture (A) is obtained by mixing atomized iron powder with at least essentially pure Ag powder particles;
  the iron-silver alloy (B) is obtained by thermal bonding and/or alloying iron-based powder particles with silver powder particles;
  the silver containing iron-based porous and permeable composite (C) is obtained by subjecting a mixture (A) containing a major part of an iron-based powder and a minor part of a silver powder or an iron-silver powder alloy (B), to one or more of the following steps: compaction, heat treatment and sizing.

The present invention also relates to use of a filtering medium in a fluid, preferably a water containing fluid, more preferably ground water, river water, industrial waste water, civic waste water, medical waste water and/or surface water for reducing the content of contaminants selected from the group consisting chlorine containing compounds, nitrates, nitrites, heavy metals, toxic inorganic substances, toxic organic compounds, microorganisms and/or combinations thereof in the fluid.

DETAILED DESCRIPTION OF THE PRESENT INVENTION

Figure 1:
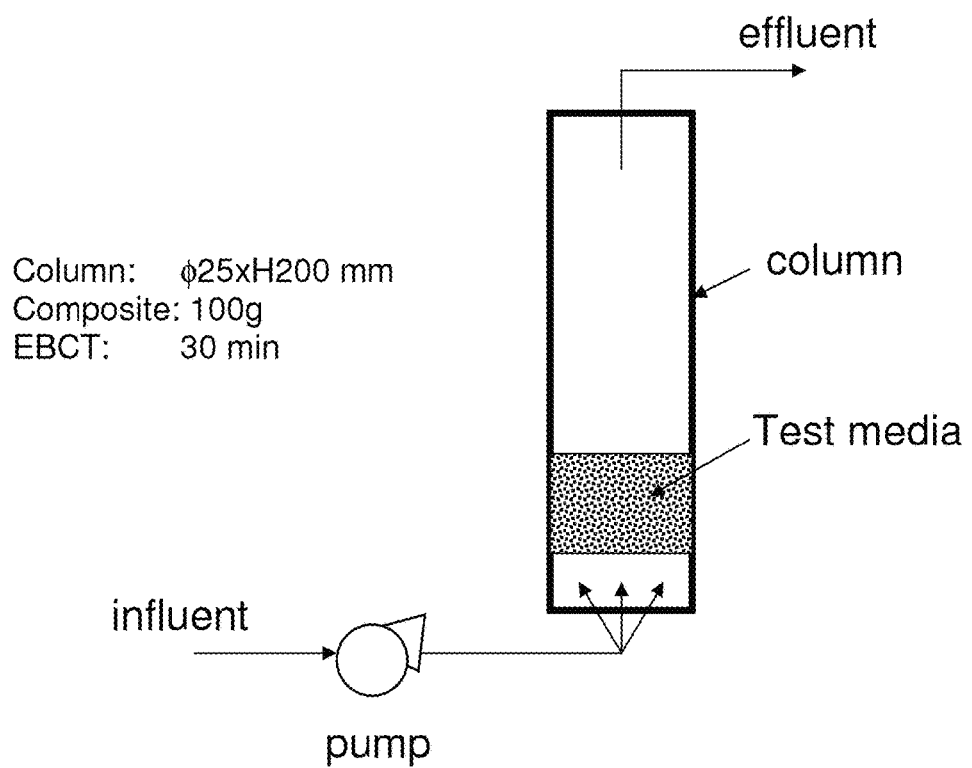
FIG. 1 shows a schematic drawing of a column test used for evaluating the performance of the filtering medium according to the invention.

The silver particles, the iron or iron-based particles, or the particles may be characterised by the particle size or the average particle size. In this context the average particle size means that 50% by weight has particle sizes above the average particle size and 50% by weight has particle sizes less than the average particle size.

The silver particles may have a purity above 99% and they may have spherical solid particle shape, and a particle size between 0.1 to 125 µm, preferably between 1 to 75 µm and most preferably between 1 to 60 µm, such as 3 to 60 µm.

Mixture (A)

In one embodiment of the present invention the filtering medium for treatment of contaminated fluids consists of or comprises a mixture, (A), containing a major part of an iron-based powder and a minor part of a silver powder. This mixture is characterized in that it contains between 0.01-5%, preferably 0.05-1% silver, by weight of the mixture.

The mixture (A) is typically produced by mixing iron-based powder particles with silver powder particles in a mixer, until the silver particles have been homogenously distributed throughout the mixture. The mixing may be performed in an ordinary mixer, such as a Z-blade mixer, cone mixer, ribbon mixer or high speed mixer for a period of time between 0.5 min and 8 hours, preferably 1 minute to 5 hours or 30 min to 3 hours.

The iron-based powder particles used originates directly from atomization of molten iron i.e. gas atomization and/or water atomization of molten iron. Said production process is the most common powder production routes in the industry today, However, the iron-based powder particles according to the invention could originate from other production processes providing particles similar to those of the processes mentioned above.

In general, atomized powder particles contain less internal porosity than particles produced by chemical reduction. The particle morphology and sizes also varies depending on the production process. Due to these differences atomized particles often have higher apparent densities than chemically reduced particles, such as apparent densities above 2.5 g/cm$^3$ or mostly above 2.8 g/cm$^3$.

Iron-based powders produced with H2-reduction usually have low apparent densities, such as less than 2.0 g/cm$^3$ or less than 1.8 g/cm$^3$.

Iron-based powders produced with CO-reduction usually have an apparent density between the two mentioned above, such as between 1.8 and 2.8 g/cm$^3$, or between 2.0 and 2.5 g/cm$^3$.

In similar fashion there are also differences regarding the specific surface areas (BET). Atomized powders have low surface area, such as less than 0.1 m$^2$/g, CO-reduced powders generally have surface areas between 0.1 and 0.18 m$^2$/g, and H2-reduced powders generally have surface areas above 0.18 m$^2$/g.

The differences in the powder particle morphology, density, porosity, surface area etc, affect the performance of the filter media according to the invention, and are (for the sake of simplicity) referenced by specifying the production route in the present application. However, it is important to point out, that it is the particle properties and not the production route that affect the properties of the filter media. Thus, any other technique that provides iron-based powder particles with properties similar to the mentioned above should be understood to be included in the embodiments of the current application.

Also other types of particles, such as activated carbon, activated alumina and zeolites, copper powder—may be added before mixing, rendering the product enhanced properties for reducing contaminants. The added amount of said other types of particles should be 0.01-10%, preferably 0.05-8%, more preferably 0.10-5% by weight of the mixture.

The iron-based powder may have a content of Fe of 90% or above, such as 95% or above. The average particle size of the iron based powder may be between 1 μm and 10 mm, for example between 20 μm and 5 mm, such as between 45 μm and 2 mm, but is not to be interpreted as limited to these particle sizes. Further, it may be that maximum 2% the iron based particles may be above 850 μm and maximum 30% by weight of the iron based particles may be below 45 μm, for example maximum 2% may be above 212 μm and maximum 30% below 45 μm.

It has surprisingly been shown that only a specified type of silver particles in combination with the atomized iron-based powder particles will render the filter medium the desired properties and performances. In order to fulfill the requirements the silver particles may have a purity above 99% and they may have spherical solid particle shape, and a particle size between 0.1 to 125 μm, preferably between 1 to 75 μm and most preferably between 1 to 60 μm, such as 3 to 60 μm but is not to be interpreted as limited to these particle ranges. In contrast to known methods and products, which include silver particles, for reducing contaminants in fluids, the silver particles used according to the present invention have a much bigger size and cannot be regarded or defined as nano-particles. This fact is of great importance since the negative aspects as regarded to the spreading of nano silver particles to various recipients can be omitted.

Figure 2:
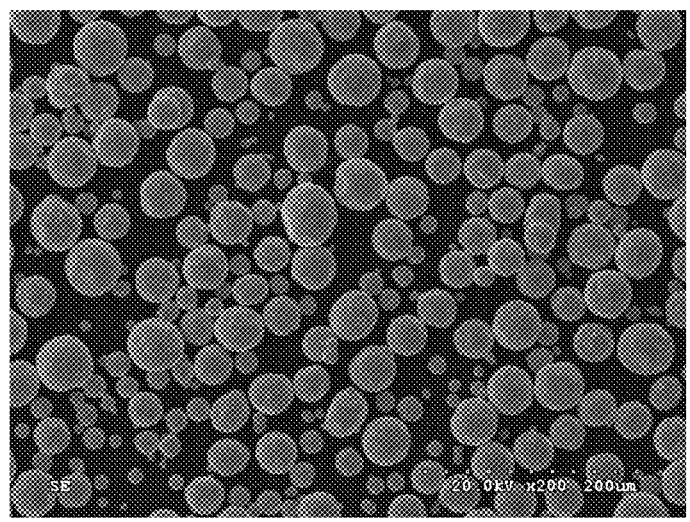
FIG. 2 illustrates example of pure silver powder with 100%<60 um

FIG. 2 shows the particle morphology of a silver powder, with particle size between 3 and 60 μm.

In one embodiment iron-based powder with a content of iron of more than 95% by weight, preferably more than 99% weight, is mixed with a Fe—Ag alloy, wherein said Fe—Ag alloy consists of Ag-particles that have been thermal-bonded or thermal-alloyed to iron particles and said Fe—Ag alloy comprises 0.01-5% by weight of silver.

In one embodiment of the present invention the filtering medium comprises the mixture (A) wherein the mixture comprises:

1) atomized iron powder with an average particle size between 10 mm and 1 μm, and with an Fe-content of at least 90% by weight of the iron powder and essentially pure Ag powder particles, with a silver content of at least 99% by weight, and wherein the mixture (A) contains between 0.01-5% Ag, by weight.

Iron-Silver Powder Alloys (B)

In one embodiment of the present invention the filtering medium consists of or comprises iron-silver powder alloy(s).

The iron-silver powder alloy(s) according to the invention may have a particle size range between 10 mm and 1 μm, preferably between 5 mm and 20 μm and most preferably between 2 mm and 45 μm but is not to be interpreted as limited to these particle sizes. The iron-silver powder alloy(s) may be obtained from the silver and iron powders according to (A).

In an embodiment the iron-silver alloy is produced by thermal bonding and/or thermal alloying, in which case silver particles are bonded and/or alloyed to the surface of iron-based particles. The amount of silver in the alloy in this embodiment is 0.01-5%. Said iron based particles originate directly from atomization of molten iron i.e. gas atomization or water atomization of molten iron. The silver particles used in the diffusion bonding process originate from pure Ag.

Figure 3:
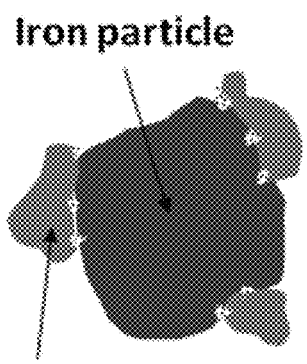
FIG. 3 is a schematic illustration of thermal bonding and thermal alloying silver particles to the surface of iron particles.
Figure 3:
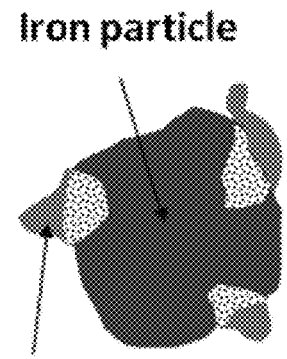

In this context, the term "thermal bonding" means that the silver particles are merely bonded to the surface of the iron-based particles below 950° C., preferably between 500 and 950° C. and most preferably between 600 and 950° C. The term "thermal alloying" means that the silver particles are firmly alloyed to the surface of the iron-based particles above 950° C. preferably between 950 and 1250° C. and most preferably between 950 and 1200° C., FIG. 3 shows a schematic illustration of thermal bonding and thermal alloying silver particles to the surface of iron particles.

In an alternative embodiment the silver particles are bonded to the surface of the iron powder through a binder.

Iron-Based Porous and Permeable Composite Containing Silver (C)

In one embodiment of the present invention the filtering medium for treatment of contaminated fluids consists of or comprises an iron-based porous and permeable composite containing silver.

Said composite can be manufactured into various forms, such as chip, flake, block or pellet, by subjecting the iron-silver alloy (B) or the iron-based powder-silver containing mixture (A) to common powder metallurgical technologies.

The use of the wording "permeable" as disclosed herein is to be interpreted as a composite or an iron-based powder body being constructed so that it is permeated or penetrated, especially by liquids or gases.

The use of the wording "porous" as disclosed herein is to be interpreted as a composite or an iron powder or body being constructed so that it is admitting the passage of gas or liquid through pores or interstices.

Thus, the iron-based porous and permeable composite containing silver (C) according to the present invention may comprise silver containing particles located in pores and cavities of the composite.

The iron-based powder mixture (A) or the iron-silver alloy (B) can be subjected to compaction and/or thermal treatment optionally followed by sizing to produce an iron-based porous and permeable composite containing silver.

Compaction is usually performed at pressures below 1000 MPa, preferably below 600 MPa, e.g. 10-1000 MPa or 20-600 MPa, to achieve a compacted density of about or less than 7.0 g/cm$^3$ to form desired shapes, such as blocks, granules or pellets. Preferably the compacted density is between 2.5-7.0 g/cm$^3$, preferably 4-6 g/cm$^3$ depending of type of iron-based powder used.

Thermal treatment usually involves temperatures below 1200° C., below 1000° C., or below 800° C., depending on the types of materials (A) or (B) used, in a reducing or inert atmosphere. The thermal treatment temperature is usually above 300° C., preferably above 400° C. Temperature intervals of interest are especially 300-1200° C., 400-1200° C., 300-1000° C., 400-1000° C., 300-800° C., 400-800° C., 300-700° C., 400-700° C., 300-600° C., 400-600° C., 300-500° C. and 400-500° C.

Sizing or gently grinding is usually performed after heat treatment and/or compaction and may be performed in any suitable equipment resulting in a particle size between 10 mm and 10 μm, preferably between 5 mm and 20 μm and most preferably between 2 mm and 45 μm.

Use of the Filtering Medium

The present invention also relates to the use of the filtering medium for treatment of contaminated fluids from multiple contaminants simultaneously, wherein a fluid is allowed to pass through or be contacted with said filtering medium. The contaminated fluids are preferably in liquid form. Said fluid may be a water containing fluid, preferably ground water, river water, industrial waste water, civic waste water, medical waste water and/or surface water. Said fluid may be used as drinking water after purification treatment according to the present invention. Said contaminants may be selected from the group consisting of chlorine containing compositions, nitrates, nitrites, heavy metals, such as As, Pb, Hg, Cd, Se, Cr and hexavalent Cr, other toxic inorganic substances, toxic organic compounds and/or microorganisms such as bacteria; or combinations thereof.

Method for Reducing the Content of Multiple Contaminants in Fluids

The present invention also relates to a method for reducing the content of multiple contaminants in fluids which comprises the steps of obtaining the iron powder-based silver containing mixture (A) or the iron-silver alloy (B), or the permeable porous composite (C) as described above and allowing one or more contaminated fluid(s) to pass through or be contacted with a filtering medium consisting of or comprising said alloy, or said mixture or said composite, thus reducing the content of multiple contaminants simultaneously.

Said filtering medium can be placed inside a container connected to the supply system of the fluid to be treated. Such containers could be placed serial or parallel and connected to additional containers containing other known substances for reducing the content of harmful substances in the fluid.

Said filtering medium could also be added to the water to be cleaned and after a certain time the filtering medium could be removed or the water could be decanted after which the purified water can be used.

The filtering medium according to the invention preferably has a specific surface area between 0.05 and 50 m$^2$/g as measured by BET (Brunauer, Emmett and Teller, 1938).

A highly surprising synergetic effect is obtained with the filtering medium according to the invention, when combining a certain type of silver powder particles with a certain type of iron powder particles. This synergetic effect is evident by the remarkably high efficiency for removal of multiple contaminants, especially the removal of bacteria, chlorine and nitrate.

An additional advantage with the method for reducing multiple contaminants simultaneously in fluids according to the present invention is, in contrast to methods such as conventional ion exchange, that no hazardous waste is generated by the method.

The filtering medium according to the present invention should have a permeability, expressed as porosity ranging from 11 to 68%, preferably 23-50%, regardless of embodiment.

One embodiment of the invention is to apply the filtering medium according to the invention to drinking water treatment, waste water (municipal and industrial) treatment and/or soil remediation.

The generated byproduct, i.e. the used filtering medium comprising the iron-silver alloy, or the iron powder-based silver containing mixture, or the porous composite, can be used in other industries, for instance as raw material for the steel industry.

In a preferred embodiment a filtering medium for reducing the content of multiple contaminants in fluids simultaneously comprises a mixture (A) containing a major part of an iron-based powder and a minor part of a silver based powder, wherein said mixture consists of:
  atomized iron powder with an average particles size between 10 μm and 150 μm in size, and with an Fe-content of at least 90% by weight of the iron powder
  Essentially pure Ag powder particles with Ag-content of at least 99% by weight, in a sufficient amount to ensure that the composition contains above 0.25 up to 1% of Ag, by weight of the mixture.

In an another preferred embodiment a filtering medium for reducing the content of multiple contaminants in fluids simultaneously comprises an iron-silver powder alloy (B) having an average particle size between 40 and 150 micrometers produced through thermal bonding of silver particles to the surface of iron particles.

The iron particles being atomized iron powder with an average particles size between 10 μm and 150 μm in size, and with an Fe-content of at least 90% by weight of the iron powder and the silver particles being essentially pure Ag powder particles with Ag-content of at least 99% by weight. The content of Ag being above 0.25 up to 1% by weight of the iron-silver alloy.

In an another preferred embodiment a filtering medium for reducing the content of multiple contaminants in fluids simultaneously comprises an iron-silver powder alloy (B) having an average particle size between 40 and 150 micrometers produced through thermal alloying in which case silver particles are alloyed to the surface of iron particles.

The iron particles being atomized iron powder with an average particles size between 10 μm and 150 μm in size, and with an Fe-content of at least 90% by weight of the iron powder and the silver particles being essentially pure Ag powder particles with Ag-content of at least 99% by weight. The content of Ag being above 0.1 up to 1% by weight of the iron-silver alloy.

EXAMPLES

Various powder materials according to table 1, showing their properties, was used in the following examples.

TABLE 1 properties of iron and copper containing powders used in the examples.

| Materials Powder sample | type | ID | % Ag | % Fe | AD, g/cm3 | PD, g/cm3 | Porosity, % | SSA, m2/kg | Particle size distribution |
|---|---|---|---|---|---|---|---|---|---|
| pure iron | H-reduced | A | 0 | >96 | 1.22 | 6.48 | 17.7 | 225 | 80% > 105 um |
|  | C-reduced | B | 0 | >97 | 2.45 | 7.23 | 8.1 | 100 | 80% < 105 um |
|  | Atomized | C | 0 | >98 | 2.95 | 7.83 | 0.5 | 50 | 80% < 105 um |
| pure silver | Ultrafine | I | >99 | 0 | 1.6 | 10.5 | 0 | 800 | 100% < 3 um |
|  | fine | J | >99 | 0 | 2.3 | 10.5 | 0 | 550 | 100% > 0.1 um 80% > 3 um 100% < 60 um |
|  | coarse | K | >99 | 0 | 3.4 | 10.5 | 0 | 210 | 80% > 45 um 100% < 125 um |

Apparent Density (AD):

The density when powder is in the loose state without agitation. It is measured by Hall flowmeter which consist of a funnel and measuring cup, where the powder passes through the funnel and flows into the cup. (ASTM B 212 and ASTM B 417)

Particle Size Distribution (PSD):

Particle size distribution data as expressed by the weight percentage of powder retained on each of a series of sieves of decreasing size (increasing mesh). (ASTM B 214)

Particle Density (PD):

The particle mass per unit volume of particle, including the inside closed pores. It is measured by pycnometer method that measures the liquid volume increase found upon adding the powder into a liquid.

Specific Surface Area (SSA):

The external powder area per unit weight of powder as measured by gas absorption (BET method).

% Fe and % Ag:

The content of iron and silver elements in the powder. It is determined by a inductively coupled plasma mass spectrometry (ICP-MS method)

Test Methods

The following analytical and testing methods for evaluation of the capability for reducing contaminants in water was used in the examples:

Bacteria (E-Coli test):

100 g of powder medium, except for the silver powders which were added in 0.5 g, was added to 250 ml water containing standard E. Coli bacteria and mixed by shaking for 10 min. After the powder medium settled, 100 ml treated water was taken for bacteria Presence/Absence test. One packet of reagent (IDEXX Laboratories) was added to the water sample in a sterile, non-fluorescing vessel and mixed by shaking and incubate at 35° C. for 24 h. The results was read at 24 h by placing a 6 W, 365 nm UV light within 5 inches of the sample. If yellow color, the test was negative (no bacteria exist). If blue fluorescence was observed, the presence of E. coli was confirmed. (USA National Environmental Methods Index 68585-22-2)

Chlorine Reduction:

100 g powder medium, except for silver powders which were added in 0.5 g, was added in 250 ml water containing ~5 mg/L ClO$^-$ by the addition of bleach solution with ~6% sodium hypochlorite). The medium was mixed with the water by stirred gently for 30 min. The amount of chlorine in raw and treated water were determined by spectrophotometer (Hach DR5000) and the percentage of chlorine reduction was calculated.

Nitrate Reduction:

100 g powder medium, except for the silver powders which were added in 0.5 g, was added to 250 ml groundwater containing ~20 mg/L-N nitrate (Martinsberg, Pa., USA). The medium was mixed with the water by gently stirring for 24 hours. The amount of nitrate in raw and treated water was determined by spectrophotometer (Hach DR5000) and the percentage of nitrate reduction was calculated.

Multiple Contaminant Reduction Efficiency (MCRE):

In order to compare the efficiency of the tested filter medium an index was calculated according to the following formula:

MCRE=(% Bacteria reduction+% Chlorine reduction+% Nitrate reduction)/3 wherein the % Bacteria reduction is either 0 or 100. The MCRE is intended to quantify the efficiency of multiple contaminant simultaneous reduction, and is expressed in %, thus 100 is the highest level of efficiency.

The value is intended purely for comparison purposes, since in practice, one contaminant may be of more importance to remove than another.

Example 1 (Comparative)

As reference examples, the powder samples according to Table 1 were tested individually for their ability of reducing bacteria, chlorine and nitrate. The tests were performed according to the earlier described testing methods. Table 2 shows powder samples used and the results.

TABLE 2

| Powder sample | Type | ID | Ag % | Bacteria killer % | Chlorine reduction % | Nitrate reduction % | MCRE % |
|---|---|---|---|---|---|---|---|
| pure iron | H-reduced | A | 0 | 0 | 98 | 6 | 35 |
|  | C-reduced | B | 0 | 0 | 100 | 14 | 38 |
|  | atomized | C | 0 | 0 | 68 | 11 | 26 |
| pure silver | ultrafine | I | 100 | 0 | 33 | 2 | 11 |
|  | fine | J | 100 | 100 | 44 | 1 | 48 |
|  | coarse | K | 100 | 0 | 39 | 2 | 14 |

For pure iron powder by itself, bacteria is not killed, have a small reduction rate (6-14%) in nitrate removal but can greatly reduced the chlorine (68-100%). Their MCRE is between 26-38.

For pure silver powder by itself, almost no reduction for nitrate, can partly reduce the chlorine and surprisingly even though they have similar particle shape in the three grades of silver powders selected in this invention, only the silver powder with 100%<60 um can completely kill the bacteria and its MCRE is 48.

Therefore, the following examples will use the fine silver powder (100%<60 um) to demonstrate the synergetic and catalyst effect to iron. The iron powder according to the invention used in the following examples was an atomised iron powder following the particle size specification maximum 2% above 212 μm and maximum 30% less than 45 μm.

Example 2

Mixtures of a major part of an iron-based powder and a minor part of a silver based powder were prepared. As reference examples pure reduced and pure atomized powders were used. The mixtures were evaluated for their removal efficiency with respect to bacteria, chlorine and nitrate. The removal efficiency was calculated as MCRE. The mixtures were evaluated according to the testing methods.

The table 3 shows that pure iron powder by itself can not kill bacteria and have an insignificant effect of the reduction of nitrate. When fine silver powder is mixed in pure iron powder, a synergetic and/or catalyst effect for can be seen with silver containing atomized powder in bacteria killing, chlorine and nitrate reduction. The content of silver must be >0.25% by weight for obtaining a satisfactory bacteria killing effect. The MCRE value is 64 when the silver is added with 0.5% by weight. A content of silver >1% by weight is not considered to be cost-effective since the performance is not improved. For example the content of silver may be between 0.25 and 1% by weight, such as between 0.25 and 0.5% by weight. It is clear from table 3 that silver containing material performs better as compared to pure iron and that it may be preferred with atomised iron combined with silver as compared to H or CO reduced iron combined with silver.

For silver containing H-reduced and CO-reduced iron powder, however, no synergetic effect is observed even when the silver is added with 1%.

Example 3

Filtering medium containing thermally bonded iron-silver alloy powder particles according to the invention were used. The alloy particles were prepared through a thermal bonding process performed at 900° C. for 30 minutes in an 75% $H_2$ and 25% $N_2$ atmosphere.

As reference examples pure reduced and pure atomized powders were used. The alloy particles were evaluated for their removal efficiency with respect to bacteria, chlorine and nitrate according to the testing methods. The combined removal efficiency was calculated as MCRE.

TABLE 3

| Category | sample | ID | Ag % | Bacteria killer % | Chlorine reduction % | Nitrate reduction % | MCRE % |
|---|---|---|---|---|---|---|---|
| Pure iron (comparative) | H-reduced | A | 0 | 0 | 98 | 6 | 35 |
| Pure iron (comparative) | CO-reduced | B | 0 | 0 | 100 | 14 | 38 |
| Pure iron (comparative) | atomized | C | 0 | 0 | 68 | 11 | 26 |
| silver containing | Atomized, mix | CJ1 | 0.25 | 0 | 56 | 12 | 23 |
| silver containing | Atomized, mix | CJ2 | 0.5 | 100 | 76 | 15 | 64 |
| silver containing | Atomized, mix | CJ2 | 1 | 100 | 65 | 17 | 61 |
| silver containing (comparative) | H-reduced, mix | AJ1 | 0.5 | 0 | 36 | 2 | 13 |
| silver containing (comparative) | H-reduced, mix | AJ1 | 1 | 0 | 30 | 4 | 11 |
| silver containing (comparative) | CO-reduced, mix | BJ1 | 0.5 | 0 | 98 | 16 | 38 |
| silver containing (conparative) | CO-reduced, mix | BJ1 | 1 | 0 | 84 | 15 | 33 |

TABLE 4

| Category | sample | ID | Ag % | Becteria killer % | Chlorine reduction % | Nitrate reduction % | MCRE % |
|---|---|---|---|---|---|---|---|
| pure iron (comparative) | H-reduced | A | 0 | 0 | 98 | 6 | 35 |
| pure iron (comparative) | CO-reduced | B | 0 | 0 | 100 | 14 | 38 |
| pure iron (comparative) | atomized | C | 0 | 0 | 68 | 11 | 26 |
| silver containing | Atomized, thermal bond | CJ3 | 0.25 | 0 | 100 | 67 | 56 |
| silver containing | Atomized, thermal bond | CJ4 | 0.5 | 100 | 99 | 60 | 86 |
| silver containing (comparative) | H-reduced, thermal bond | AJ2 | 0.5 | 0 | 45 | 30 | 25 |
| silver containing (conparative) | CO-reduced, thermal bond | BJ2 | 0.5 | 0 | 84 | 28 | 37 |

The table shows pure iron powder by itself can not kill bacteria and have an insignificant effect of the reduction of nitrate. When the silver is thermal bonded to atomized iron powder, a much greater synergetic and/or catalyst effect can be achieved compared to the mix of iron with the same amount of silver (Table 3). The MCRE increases from 64 to 86 with 0.5% silver addition. The content of silver must be >0.25% by weight for obtaining a satisfactory bacteria killing effect. For example the content of silver may be between 0.25 and 1% by weight, such as between 0.25 and 0.5% by weight.

However, no such significant synergetic and/or catalyst effect is achieved in the silver thermal-bonded in H-reduced and CO-reduced iron powders.

Example 4

Filtering medium containing thermally alloyed iron-silver powder particles according to the invention were prepared. The alloy particles were prepared through a thermal alloying process performed at 1120° C. for 30 minutes in an 75% $H_2$ and 25% $N_2$ atmosphere As reference examples pure reduced and pure atomized powders were used. The mixtures were evaluated for their removal efficiency with respect to bacteria, chlorine and nitrate according to the testing methods. The removal efficiency was calculated as MCRE.

TABLE 5

| Category | sample | ID | Ag % | Bacteria killer % | Chlorine reduction % | Nitrate reduction % | MCRE % |
|---|---|---|---|---|---|---|---|
| Pure iron (comparative) | H-reduced | A | 0 | 0 | 98 | 6 | 35 |
| Pure iron (comparative) | CO-reduced | B | 0 | 0 | 100 | 14 | 38 |
| Pure iron (comparative) | atomized | C | 0 | 0 | 68 | 11 | 26 |
| silver containing | Atomized, thermal-alloy | CJ5 | 0.1 | 0 | 96 | 45 | 47 |
| silver containing | Atomized, thermal-alloy | CJ6 | 0.25 | 100 | 95 | 68 | 88 |
| silver containing | Atomized, thermal-alloy | CJ7 | 0.5 | 100 | 90 | 67 | 86 |
| silver containing (comparative) | H-reduced, thermal-alloy | AJ3 | 0.5 | 0 | 55 | 40 | 32 |
| silver containing (comparative) | CO-reduced, thermal-alloy | BJ3 | 0.5 | 0 | 76 | 35 | 37 |

The table shows pure iron powder by itself can not kill bacteria and have an insignificant effect of the reduction of nitrate. When the silver is thermal-alloyed to atomized iron powder, a similar synergetic and/or catalyst effect can be achieved with a half of silver addition compared to the silver thermal-bonded iron powder (Table 4). The MCRE increases from 64 obtained with the iron-silver mix to 88 with the 0.25% silver thermal-alloyed iron powder. The content of silver can be reduced to a half of amount for bacteria killing compared to the iron-silver mix and silver thermal-bonded iron powder but it must be >0.1% by weight for obtaining a satisfactory bacteria killing effect. For example the content of silver may be between 0.1 and 1% by weight, such as between 0.1 and 0.5% by weight.

However, no such significant synergetic and/or catalyst effect is achieved in the silver thermal alloyed in H-reduced and CO-reduced iron powders.

Example 5

A sample of natural occurring water, ground water from Martinsburg, Pa., USA, was used. Table 6 shows the properties of the ground water sample. The sample was spiked with *E. coli* bacteria, arsenic hexavalent chromium (Cr VI) and chlorine (5 mg/L ClO— by adding bleach solution with ~6% sodium hypochlorite). Table 6 shows the properties of the ground water sample.

TABLE 6

| | |
|---|---|
| Nitrate[mg/l] (as N) | 20.2 |
| pH | 7.27 |
| Alkalinity [mg/l] | 158 |
| Acidity [mg/l] | <1.0 |
| Total hardness [mg/l] | 168 |
| Conductivity [uS/cm] | 350 |

The test was performed by pumping the water into a column having a test material, as shown in FIG. 1. The empaty bed contact time, EBCT, was 30 minutes. The effluent water was analyzed with regards to contaminants after certain time intervals. The content of contaminants at 0 hours is equal to the content in the non treated water (influent). 100 g filter medium consisting of atomized iron powder thermal-alloyed with 0.5% silver was used.

The concentrations of different contaminants in the water (effluent) passing the column after various time intervals are shown in table 7.

As can be seen in table 7, the filter medium according to the invention effectively removes multiple contaminants in the water, in this case arsenic, hexavalent chromium, chlorine, nitrates and *E. coli* bacteria.

The invention claimed is:

1. A filtering medium for reducing the content of contaminants in fluids, wherein said filtering medium comprises iron and silver in a form chosen from:
   a mixture (A) comprising an iron-based or iron powder and a silver powder, with an Fe-content of at least 90% by weight of the iron-based or iron powder, wherein the mixture (A) comprises between 0.01-5% Ag by weight, wherein the mixture (A) comprises atomized iron-based or iron powder with an average particle size of 10 μm to 10 mm; or
   a silver containing iron-based porous and permeable composite (C), wherein the silver containing iron-based porous and permeable composite (C) is obtained by subjecting the mixture (A) to one or more of the following: compaction, heat treatment and sizing.

2. The filtering medium according to claim 1, wherein the filtering medium comprises iron and silver in the form of mixture (A), wherein the silver powder is in the form of:
   essentially pure silver powder particles with a silver content of at least 99% by weight.

3. The filter medium according to claim 2, wherein the mixture (A) comprises between 95 and 99.99% by weight of iron.

4. The filter medium according to claim 2, wherein the mixture (A) comprises atomized iron-based or iron powder with an average particle size between 10 μm and 150 μm; and
   wherein the essentially pure Ag powder particles with Ag-content of at least 99% by weight are present in a sufficient amount to ensure that the mixture (A) contains above 0.25 up to 1% of Ag, by weight of the mixture (A).

5. The filtering medium according to claim 1, wherein the filtering medium comprises iron and silver in the form of permeable composite (C).

6. The filtering medium according to claim 1, wherein said contaminants are selected from the group consisting of chlorine containing compounds, nitrates, nitrites, heavy metals, microorganisms and/or combinations thereof.

7. A filtering medium for reducing the content of contaminants in fluids, wherein said filtering medium comprises iron and silver in a form of a mixture (A) comprising an iron-based or iron powder and a silver powder, with an Fe-content of at least 90% by weight of the iron-based or

TABLE 7

| | Nitrate | | Arsenic | | Hex-Cr (VI) | | Chlorine | | E-coli bacteria | |
|---|---|---|---|---|---|---|---|---|---|---|
| Hours | (N) mg/l | % reduction | mg/l | % reduction | Cr VI mg/l | % reduction | (Cl2) mg/l | % reduction | Yes+, No– | % reduction |
| 0 | 20.2 | 0 | 1.12 | 0 | 0.51 | 0 | 5.3 | 0 | + | 0 |
| 2 | 17.3 | 14.4 | 0.01 | 99.1 | 0.011 | 97.8 | 0.01 | 99.8 | – | 100 |
| 4 | 15.4 | 23.8 | 0.005 | 99.6 | 0.011 | 97.8 | 0.01 | 99.8 | – | 100 |
| 6 | 13.5 | 33.2 | 0.002 | 99.8 | 0.01 | 98.0 | 0.01 | 99.8 | – | 100 |
| 12 | 9.2 | 54.5 | 0.001 | 99.9 | 0.011 | 97.8 | 0.01 | 99.8 | – | 100 |
| 24 | 6.1 | 69.8 | 0.001 | 99.9 | 0.012 | 97.6 | 0.01 | 99.8 | – | 100 |
| 28 | 6.0 | 70.3 | 0.001 | 99.9 | 0.009 | 98.2 | 0.01 | 99.8 | – | 100 |
| 30 | 5.9 | 70.8 | 0.002 | 99.8 | 0.014 | 97.3 | 0.01 | 99.8 |  | 100 |
| 32 | 6.6 | 67.3 | 0.001 | 99.9 | 0.007 | 98.6 | 0.01 | 99.8 | – | 100 |
| 48 | 5.1 | 74.8 | 0.001 | 99.9 | 0.01 | 98.0 | 0.01 | 99.8 | – | 100 | iron powder, wherein the mixture (A) comprises atomized iron-based or iron powder with an average particle size of 10 μm to 10 mm.

8. The filter medium according to claim 7, wherein the mixture (A) comprises between 95 and 99.99% by weight of iron.

9. The filtering medium according to claim 8, wherein the mixture (A) comprises between 0.01-5% Ag by weight.

10. The filter medium according to claim 9, wherein the mixture (A) comprises atomized iron-based or iron powder with an average particle size between 10 μm and 150 μm.

* * * * *